Aug. 24, 1926.
H. L. INGERSOLL
1,596,878
METHOD OF AND APPARATUS FOR OPERATING BOOSTER SUPPLEMENTED LOCOMOTIVES
Filed Dec. 2, 1922     2 Sheets-Sheet 1
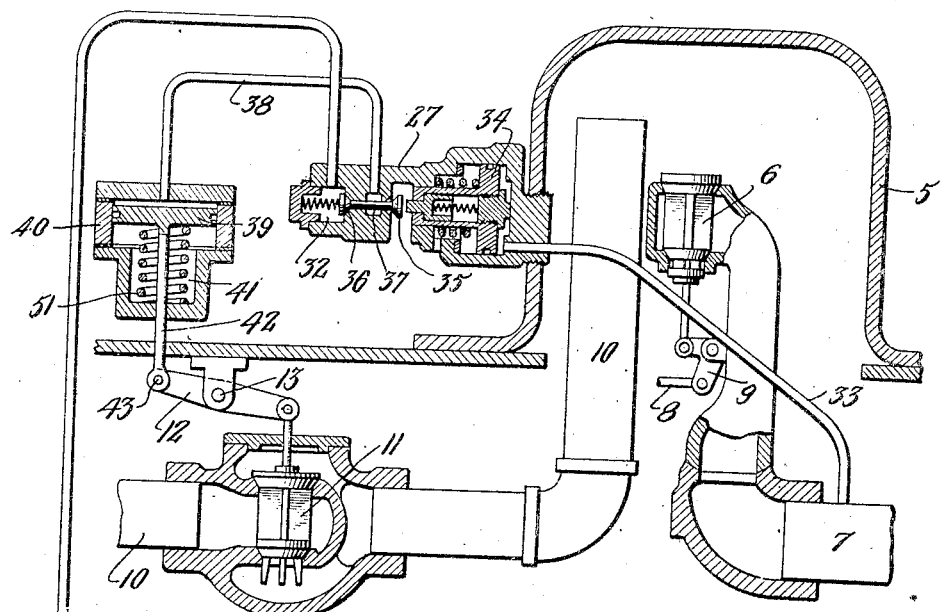
Fig. 1.
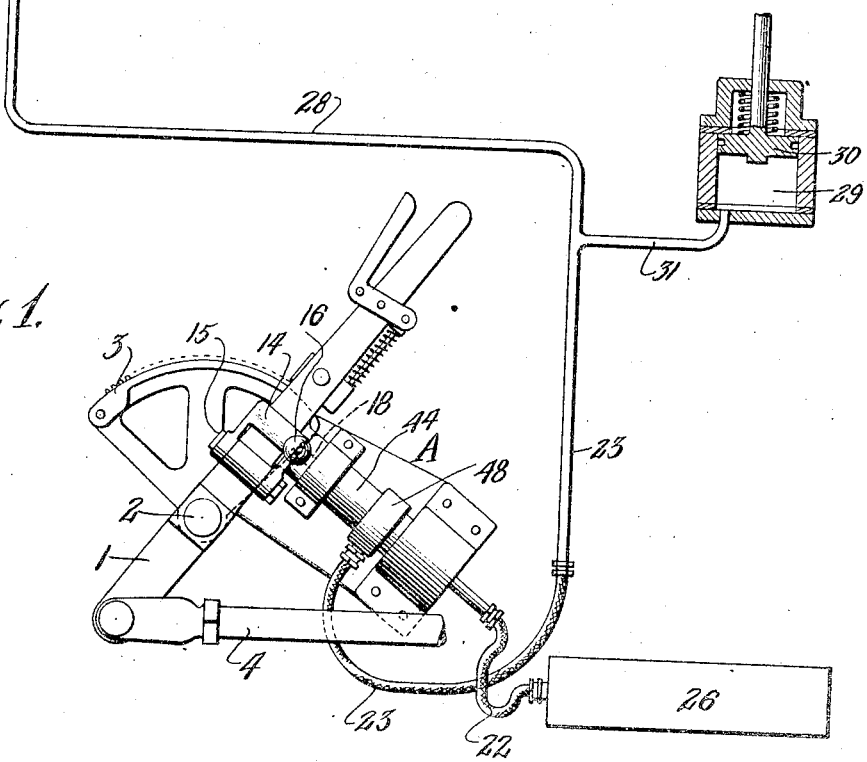
Witness.
Gustav Genzlinger.
Inventor
Howard L. Ingersoll
By his Attorneys Aug. 24, 1926.
H. L. INGERSOLL
1,596,878
METHOD OF AND APPARATUS FOR OPERATING BOOSTER SUPPLEMENTED LOCOMOTIVES
Filed Dec. 2, 1922  2 Sheets-Sheet 2
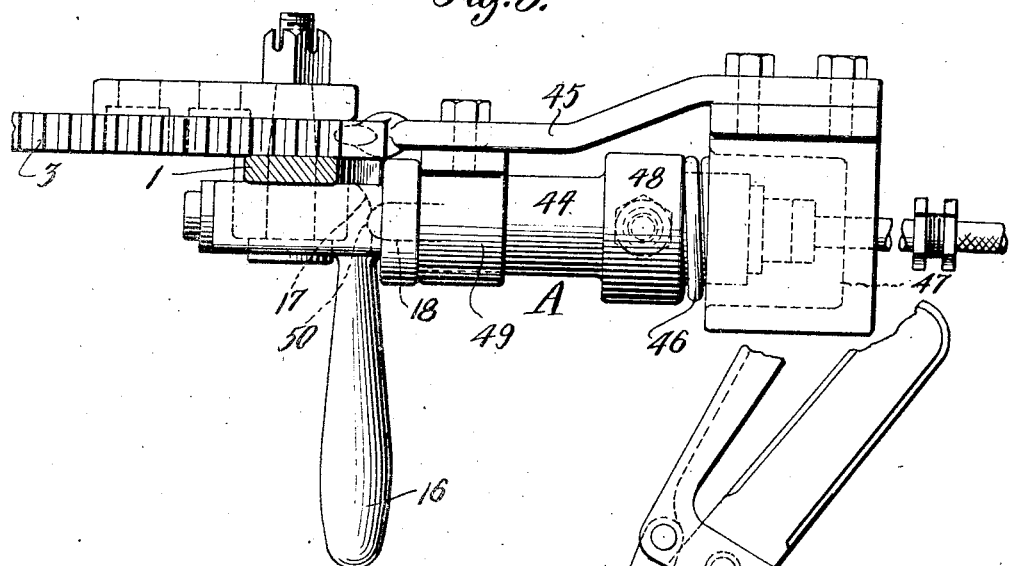
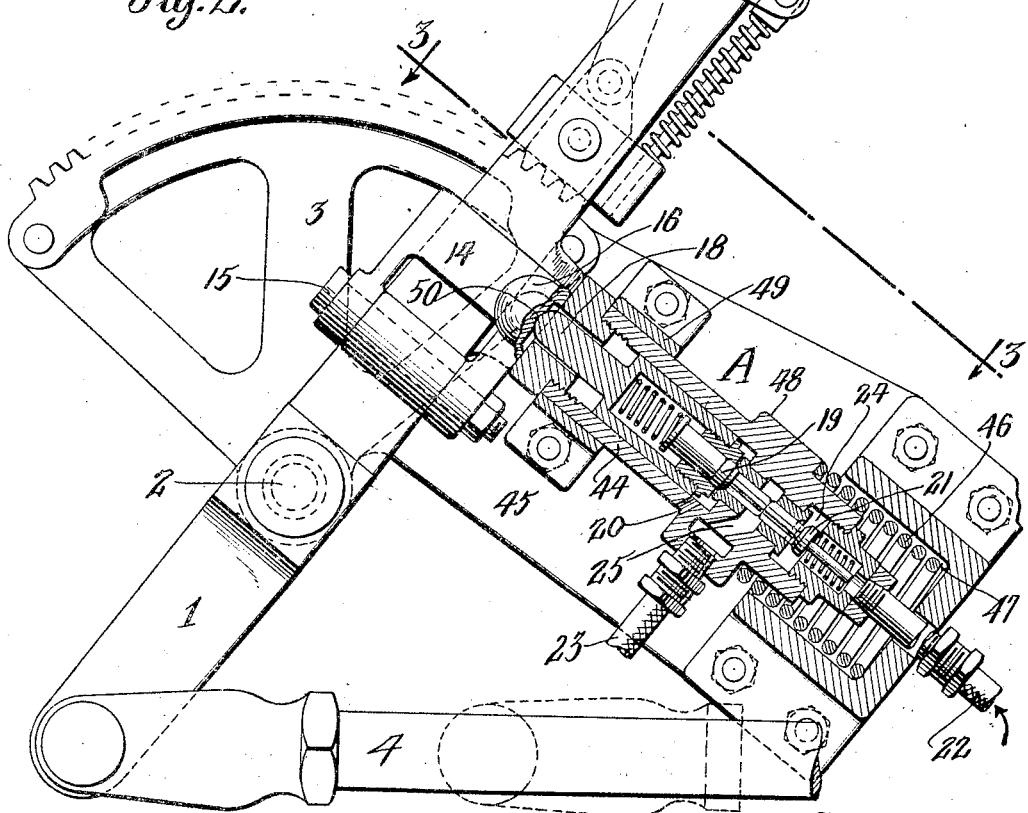

Patented Aug. 24, 1926.

1,596,878

UNITED STATES PATENT OFFICE.

HOWARD L. INGERSOLL, OF WHITE PLAINS, NEW YORK, ASSIGNOR TO LOCOMOTIVE BOOSTER COMPANY, A CORPORATION OF DELAWARE.

METHOD OF AND APPARATUS FOR OPERATING BOOSTER-SUPPLEMENTED LOCOMOTIVES.

Application filed December 2, 1922. Serial No. 604,458.

This invention relates to booster supplemented locomotives such, for instance, as are illustrated in patent to Howard L. Ingersoll No. 1,339,395, issued May 11th, 1920 and particularly to an improved method of and apparatus for operating such locomotives.

It is an object of the present invention to provide means for controlling the booster of a booster supplemented locomotive which will not in any way disturb, impair, change or modify the normal functions and methods of operating the locomotive itself.

Booster motors of the type contemplated herein and also as disclosed in the above mentioned patent are intended to aid the main locomotive in starting and at slow speeds particularly up a long heavy grade. They are preferably arranged to drive the wheels of a trailer truck which, although they carry considerable weight, normally are "dead" in so far as development of power is concerned. Trailer truck wheels are also of much smaller diameter than the main driving wheels and by arranging the booster motor to drive them a very great increase in the draw bar pull of a given locomotive can be effected. They are designed to be cut out as soon as the locomotive attains a certain predetermined speed say for example ten to twenty miles an hour. In the arrangement disclosed in the above mentioned patent it was intended to operate the booster motor only during such times as the reverse lever was moved into the corner as it is colloquially expressed and immediately upon hooking up or moving the reverse lever even so much as one notch away from the corner it was intended that the booster motor should be cut out.

It is the object of the present invention to employ a method of and to provide apparatus for the operation of a booster supplemented locomotive such that the main engines may be operated expansively substantially during the period that the booster is supplementing them whereby steam will be available for operation of the booster motor without exceeding the boiler capacity while at the same time the net tractive effort is increased.

More specifically stated it is an object of my invention to provide a new type of pilot valve, known as the reverse lever pilot valve, for controlling the flow of fluid pressure to the booster apparatus. In this connection it should be stated that I prefer to utilize air pressure in the control of the booster motor. I provide a pilot valve which is adapted to be opened upon engagement with the reverse lever or with a part carried by the reverse lever and one which is mounted in a movable housing adapted to move in the direction of motion of the valve itself so that the housing and valve will follow the reverse lever when it is retracted from a corner position. The details of construction however will be more clear from an inspection of the accompanying drawings which illustrate the invention in its preferred form and wherein Figure 1 is a schematic diagram illustrating my improved booster controlling mechanism; Figure 2 is an enlarged side elevation of the reverse lever of a locomotive with my invention associated therewith and illustrated in section; and Figure 3 is a section on the line 3—3 of Figure 2. I wish it to be understood that my invention in its broadest aspect could be incorporated for use in connection with some other moving part in the controlling mechanism for the locomotive, the reverse lever being chosen for illustration simply because it is the preferred arrangement.

In Figure 1 I have diagrammatically illustrated the reverse lever 1 of a locomotive which is pivoted at 2 for swinging movement across the quadrant 3 in a manner well known in this art. The reach rod 4 attached to the lower end of the rod 1 extends to the mechanism, whatever it may be, for altering the valve cut off for the main cylinders of the locomotive.

Within the dome 5 of the locomotive is located the usual main throttle valve 6 and dry pipe 7 leading to the main cylinder valve chests. The throttle is operated in the usual manner from the cab (not shown) through the medium of the rod 8 and bell crank lever 9.

From the dome 5 there also extends the booster motor steam supply pipe 10 in which is located any suitable throttle valve 11 adapted to be opened when the lever 12, which is pivoted at 13, is rocked downwardly at its left hand end in a manner hereinafter to be described.

The booster motor, of course, is not designed nor intended to run the locomotive by itself and I therefore prefer to arrange its controlling devices in such manner that it will be impossible to cut in the booster motor until after the main cylinders of the locomotive are in operation. I therefore associate the controlling mechanism for the booster motor with some moving part of the controlling mechanism for the main locomotive and I prefer and have shown it as associated with the reverse lever 1 of the main locomotive as above stated.

When the engineman starts the main locomotive he moves the reverse lever 1 into the corner as it is colloquially expressed. If he desires the booster motor to be thrown into operation after steam has been admitted through the main throttle 6 he raises the latch or movable element 14 which is pivotally mounted upon the bolt 15 carried by the reverse lever to the position indicated in the drawings. For this purpose the latch or element 14 is provided with the handle 16. The normal position for this latch when the booster motor is not to be operated would be hanging downwardly out of the path of parts to be described later so that when the reverse lever were moved into the corner there would be no effect upon the controlling mechanism for the booster motor. The position indicated in the drawings however is the position which it would occupy when it is intended to use the booster motor.

It will be noted that in the operative position of the latch 14 the cam surface 17 with which it is provided (see Fig. 3) engages the plunger 18 of the reverse lever pilot valve structure indicated as a whole by the reference character A. The cam surface 17 is provided so that it is possible to raise the latch 14 by means of a handle 16 even after the reverse lever may have been put all the way into the corner. When the plunger 18 is depressed the valve 19 is seated (see Fig. 2) and exhaust to the atmosphere through port 20 cut off. Simultaneously valve 21 is lifted from its seat so that fluid pressure, preferably air, can enter through the supply pipe 22 and pass out through the distributing pipe 23 through the medium of chambers 24 and 25. The air pressure may be obtained from any suitable reservoir 26. Fluid operating pressure therefore can reach valvular device 27 through connecting pipe 28 and can also reach the chamber 29 below the piston 30 in a device known in this art as the booster entraining motor. The latter however is not illustrated herein completely and in detail for the reason that it forms no part of the present invention. Suffice it to say that when the piston 30 is moved to its upper position indicated in Figure 1 the booster motor is entrained to the wheel or axle of the locomotive or other part which it is intended to drive. Connection from pipe 23 is made through pipe 31.

It will be understood of course that the layout of Figure 1 is entirely diagrammatic, no attempt having been made to show the various parts in their actual physical relation to one another but only in their functional relation.

From the foregoing it will be seen that air pressure has reached the chamber 32 in the valvular device 27 which is known in this art as the dome pilot valve. Now as soon as the engineman manipulates the main throttle 6 steam pressure from the dry pipe 7 will be conducted through the by-pass 33 to the right hand side of the piston 34 which latter will then be moved toward the left or in a direction to seat the valve 35 and unseat the valve 36, the valve 35 controlling simply a port to the atmosphere for purposes of exhaust. Fluid operating pressure can now travel from the chamber 32 into the chamber 37 and from thence through the pipe 38 to the upper face of the piston 39 in the booster throttle operating cylinder 40. The piston 39 is then moved downwardly against the pressure of the spring 41 and by means of the piston rod 42 pivoted at 43 to the lever 12, it rocks said lever 12 in a direction to open the booster throttle 11. Steam can now pass from the dome down through the pipe 10 to the cylinders of the booster motor not shown as the booster motor per se forms no part of the present invention.

The foregoing condition will continue until such time as the engineman moves back or hooks up the reverse lever 1 beyond a certain predetermined position. Referring to Figure 2 particularly and also to Figure 3 it will be seen that the housing 44 for the valvular devices above described is slidably mounted in a bracket 45 secured to the quadrant 3.

The spring 46 held in the cup shaped recess 47 of the bracket 45 urges the housing 44 together with its associated parts toward the reverse lever or in the direction of the opening and closing movements of the plunger 18, the spring 46 bearing against the lower side of the annular shoulder 48 on the housing 44. Therefore as the reverse lever is retracted the entire reverse lever pilot valve mechanism will follow it until such time as the upper side of the annular shoulder 48 is brought into contact with the supporting abutment 49. In this way the valve 19 will be kept seated and the valve 24 will be kept in open position in certain predetermined retracted positions of the reverse lever. There is, therefore, a certain range of movement of the reverse lever which is idle movement in so far as the function of the pilot valve is concerned. When the reverse lever is pulled beyond the point at which abutment 48 will engage abutment 49 valve 19 will be opened and valve 21 closed thereby shutting off the supply of fluid pressure to the booster motor controlling apparatus.

It will be noted that the connections 22 and 23 are flexible to permit of the sliding movement of the valve housing 44 above described. A small depression or notch 50 is provided in the cam surface 17 so that after the booster latch 14 has been put into operative position it will be held there until forcibly withdrawn or until the reverse lever is retracted.

Thus the reverse lever pilot valve will close communication between pipes 22 and 23 and thereby cut off the supply of operating fluid to the booster throttle operating valve 40. The booster throttle valve 11 will then be closed by the spring 51 and consequently no more steam will be admitted to the cylinders of the booster motor.

By the foregoing arrangement it is possible to operate the booster motor even when the reverse lever has been hooked up somewhat. In this way the main cylinders of the locomotive can be using steam expansively and still have the benefit of the booster motor's assistance which is of particular advantage on long pulls as it helps to keep up the steam pressure in the boiler and still obtain the benefit of the booster engine.

The invention herein may possibly be better understood and more thoroughly appreciated if the following facts be borne in mind. Normal operation of an ordinary locomotive requires the reverse lever after starting to be held in the corner until a certain speed has been attained. The boiler is designed to have sufficient capacity for this purpose. In a locomotive of a given type, however, supplemented by a booster such a precedure might drain the boiler especially on long slow pulls up heavy grades. I, therefore, propose to hook up the reverse lever of a booster supplemented locomotive prior to the time at which such step would normally be taken and allow it to work expansively while at the same time keeping the booster motor in effective operation. The net result is a greater draw bar pull without draining of the boiler than would otherwise be possible. The loss of power incident to working the main engines expansively is more than made up for by the added tractive effort of the booster motor.

I claim:

1. A controlling device for booster motors for locomotives comprising a moving part in the controlling mechanism for the main locomotive, a valve juxtaposed to the path of movement of said moving part, and a member adapted to maintain the valve in open position in certain predetermined positions of the moving part including a position in which steam in the main cylinders of the locomotive has begun to work expansively.

2. Controlling mechanism for locomotive booster motors comprising in combination with a moving part in the controlling mechanism for the locomotive, a valve adapted to be opened by said moving part and held open in certain predetermined positions thereof including a position in which the locomotive is working steam expansively.

3. Controlling mechanism for locomotive booster motors comprising in combination with a moving part in the controlling mechanism for the locomotive, a source of fluid pressure supply for the booster controlling mechanism, a valve for said supply, a movable housing for said valve, and a flexible connection between the housing and the supply and between the housing and the booster controlling mechanism, said valve and housing being under the control of the aforesaid moving part.

4. Controlling mechanism for locomotive booster motors comprising in combination with a moving part in the controlling mechanism for the locomotive, a source of fluid pressure supply for the booster controlling mechanism, a valve for said supply, a movable housing for said valve, said valve being adapted to be opened by said moving part in predetermined positions thereof, means urging the housing in a direction to keep the valve open in said predetermined positions, stop means for the housing whereby the valve may be permitted to close upon assumption by said moving part of a position different from one of the predetermined positions, and a flexible connection between the housing and the booster controlling mechanism and between the housing and the supply.

5. Controlling mechanism for locomotive booster motors comprising in combination with the reverse lever and the quadrant, a source of fluid pressure supply for the booster controlling mechanism, a valve for said supply, a housing for the valve slidably mounted on the quadrant, said valve being opened by engagement with the reverse lever, means urging the housing with its valve toward the reverse lever to maintain the valve in open position, stop means for the housing whereby the valve may be permitted to close upon engagement of the housing with said stop means, and a flexible connection between housing and booster controlling mechanism and between housing and supply.

6. Controlling mechanism for locomotive booster motors comprising in combination with the reverse lever and the quadrant, a source of fluid pressure supply for the booster controlling mechanism, a valve for said supply normally yieldingly held in closed position, a housing for the valve mounted on the quadrant for sliding movement in the direction of the opening and closing of said valve, said valve being opened by engagement with the reverse lever, means urging the housing with its valve toward the reverse lever to maintain the valve in open position, stop means for the housing whereby the valve may be permitted to close upon engagement of the housing with said stop means, and a flexible connection between housing and booster controlling mechanism and between housing and supply.

7. A controlling mechanism for a locomotive booster motor comprising in combination with a moving part in the locomotive reversing mechanism, a pilot valve for the booster system controlled by said moving part, and means permitting movement of the moving part while the booster motor is operating which movement is idle in so far as the function of the pilot valve is concerned.

8. Controlling mechanism for locomotive booster motors comprising in combination with a moving part in the controlling mechanism for the locomotive, a pilot means for the booster controlling mechanism adapted to be actuated by said moving part and to be maintained in actuated condition in certain predetermined positions of said moving part including a position in which the locomotive is working steam expansively.

In testimony whereof I have hereunto signed my name.

HOWARD L. INGERSOLL.